(12) United States Patent
Yu et al.

(10) Patent No.: US 9,866,081 B2
(45) Date of Patent: Jan. 9, 2018

(54) MOTOR ROTOR ASSEMBLY AND MOTOR COMPRISING THE SAME

(71) Applicant: Zhongshan Broad-Ocean Motor Co., Ltd., Zhongshan (CN)

(72) Inventors: Yueqiang Yu, Zhongshan (CN); Shikun Chen, Zhongshan (CN); Jianhua Zeng, Zhongshan (CN); Yanli Qiu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 367 days.

(21) Appl. No.: 14/838,388

(22) Filed: Aug. 28, 2015

(65) Prior Publication Data
US 2015/0372550 A1    Dec. 24, 2015

Related U.S. Application Data

(63) Continuation-in-part of application No. PCT/CN2014/087343, filed on Sep. 24, 2014.

(30) Foreign Application Priority Data

Apr. 30, 2014  (CN) .................. 2014 2 0221983 U

(51) Int. Cl.
| | | |
|---|---|---|
| H02K 15/16 | (2006.01) | |
| H02K 1/27 | (2006.01) | |
| H02K 7/08 | (2006.01) | |

(52) U.S. Cl.
CPC .......... H02K 1/2786 (2013.01); H02K 1/276 (2013.01); H02K 7/083 (2013.01); H02K 15/165 (2013.01)

(58) Field of Classification Search
CPC .......... H02K 1/27; H02K 1/276; H02K 1/278; H02K 1/2786; H02K 1/28; H02K 1/30; H02K 7/00; H02K 7/08; H02K 7/083; H02K 15/16; H02K 15/165
USPC .......................... 310/43, 216.114–216.115, 310/216.128–216.134, 261.1
See application file for complete search history.

(56) References Cited

U.S. PATENT DOCUMENTS

| | | | | |
|---|---|---|---|---|
| 5,886,441 | A * | 3/1999 | Uchida | H02K 1/2773 310/156.57 |
| 6,234,767 | B1 * | 5/2001 | Takeda | H02K 1/276 417/355 |
| 6,437,473 | B1 * | 8/2002 | Mobius | H02K 1/2766 29/598 |
| 6,441,525 | B1 * | 8/2002 | Koharagi | H02K 1/2766 310/156.38 |
| 7,479,723 | B2 * | 1/2009 | Dawsey | H02K 1/2766 310/156.57 |
| 2008/0315715 | A1 * | 12/2008 | Wang | H02K 1/276 310/262 |
| 2012/0104903 | A1 * | 5/2012 | Tang | H02K 29/08 310/68 B |

(Continued)

*Primary Examiner* — Tran Nguyen
(74) *Attorney, Agent, or Firm* — Matthias Scholl, PC; Matthias Scholl

(57) ABSTRACT

A motor rotor assembly including: a rotor core, a plurality of permanent magnets, and end plates. The permanent magnets are disposed on the rotor core, and the end plates are disposed at two end surfaces of the rotor core, respectively. A plurality of grooves is disposed at the outer edge of the top surface of the end plates, a plurality of convex columns protrudes from the bottom wall of the end plates.

18 Claims, 5 Drawing Sheets

(56) References Cited

U.S. PATENT DOCUMENTS

2012/0194011 A1* 8/2012 Liu ................... H02K 1/278
310/43

* cited by examiner

US 9,866,081 B2

MOTOR ROTOR ASSEMBLY AND MOTOR COMPRISING THE SAME

CROSS-REFERENCE TO RELATED APPLICATIONS

This application is a continuation-in-part of International Patent Application No. PCT/CN2014/087343 with an international filing date of Sep. 24, 2014, designating the United States, now pending, and further claims priority benefits to Chinese Patent Application No. 201420221983.7 filed Apr. 30, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

This invention relates to a motor rotor assembly and a motor comprising the same.

Description of the Related Art

Typically, a motor rotor assembly includes a rotor core and end plates disposed at the ends of the rotor core. A plurality of grooves is disposed at the outer edge of the top surface of the end plates, and weighting materials are filled in the grooves to adjust the dynamic balance of the rotor. However, the weighting materials can become detached from the grooves when the motor rotor runs at higher speeds. This adversely affects the operation of the motor and poses a danger.

SUMMARY OF THE INVENTION

In view of the above-described problems, it is one objective of the invention to provide a motor rotor assembly and a motor comprising the same. The motor rotor assembly has simple structure. The top surfaces of the convex columns can be melted using soldering iron to form an overturned mushroom-head structure which can tightly press and fix the weighting materials in the grooves. The fixing mode is reliable, and can effectively prevent the detachment of the weighting materials from the grooves. The motor has simple structure, reliable fixing and high security.

To achieve the above objective, in accordance with one embodiment of the invention, there is provided a motor rotor assembly comprising: a rotor core, a plurality of permanent magnets, and end plates. The permanent magnets are disposed on the rotor core, and the end plates are disposed at two end surfaces of the rotor core, respectively. A plurality of grooves is disposed at the outer edge of the top surface of the end plates, a plurality of convex columns protrudes from the bottom wall of the end plates.

In a class of this embodiment, a plurality of bosses protrudes from a side wall of the end plates.

In a class of this embodiment, the end plates, the convex columns, and the bosses are integrated in a one-step injection molding.

In a class of this embodiment, the rotor core is provided with a plurality of through holes, and joint pins are disposed in the through holes to connect the end plates at two end surfaces of the rotor core.

In a class of this embodiment, the two end plates, the joint pins and the rotor core are integrated in a one-step injection molding; a plurality of curved mounting grooves is disposed on the rotor core, and the permanent magnets are curved in shape and are embedded in the mounting grooves.

In another aspect, the invention also provides a motor. The motor comprises a revolving shaft, a rotor assembly, a stator assembly, a housing, and end covers. The rotor assembly is disposed on the revolving shaft. The stator assembly and the housing are connected together and sleeved on the rotor assembly. The end covers are disposed at two ends of the housing. The revolving shaft is supported by bearings of the two end covers. The motor rotor assembly comprises a rotor core, a plurality of permanent magnets and end plates. The permanent magnets are disposed on the rotor core, and the end plates are disposed at two end surfaces of the rotor core, respectively. A plurality of grooves is disposed at the outer edge of the top surface of the end plates, a plurality of convex columns protrudes from the bottom wall of the end plates.

In a class of this embodiment, a plurality of bosses protrudes from a side wall of the end plates.

In a class of this embodiment, the end plates, the convex columns, and the bosses are integrated in a one-step injection molding.

In a class of this embodiment, the rotor core is provided with a plurality of through holes, and joint pins are disposed in the through holes to connect the end plates at two end surfaces of the rotor core.

In a class of this embodiment, the two end plates, the joint pins and the rotor core are integrated in a one-step injection molding; a plurality of curved mounting grooves is disposed on the rotor core, and the permanent magnets are curved in shape and are embedded in the mounting grooves.

Compared with existing technologies, advantages of the motor rotor assembly and a motor comprising the same according to embodiments of the invention are given below.

1. The motor rotor assembly has simple structure. The top surfaces of the convex columns can be melted using soldering iron to form an overturned mushroom-head structure which can tightly press and fix the weighting materials in the grooves. The fixing mode is reliable, and can effectively prevent the detachment of the weighting materials from the grooves.

2. The bosses protruding from the side wall of the end plates increases the contact area of the weighing materials and the grooves, thereby ensuring the reliable arrangement of the weighting materials.

3. The end plates, the convex columns and the bosses are integrated in a one-step injection molding, and thus the production process is simple with low production costs, which facilitates the popularization.

4. The motor has simple structure, reliable fixing and high security.

DETAILED DESCRIPTION OF THE EMBODIMENTS

For further illustrating the invention, experiments detailing a motor rotor assembly and a motor comprising the same are described below. It should be noted that the following examples are intended to describe and not to limit the invention.

Figure 1:
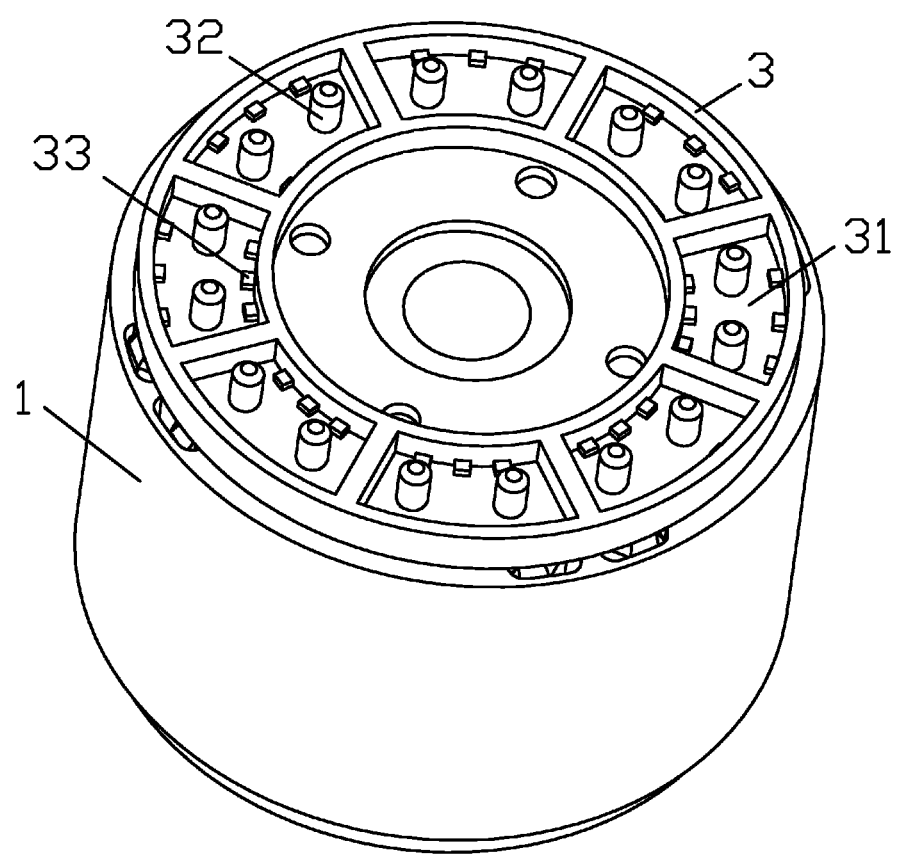
FIG. 1 is a stereogram of a motor rotor assembly in accordance with one exemplary embodiment of the invention.
Figure 2:
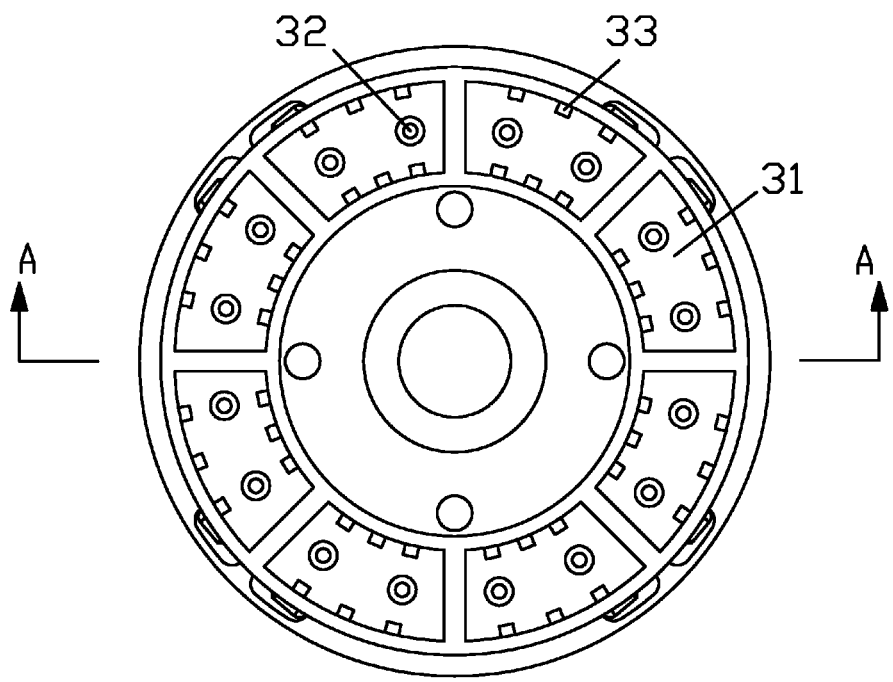
FIG. 2 is a top view of a motor rotor assembly in accordance with one exemplary embodiment of the invention.
Figure 3:
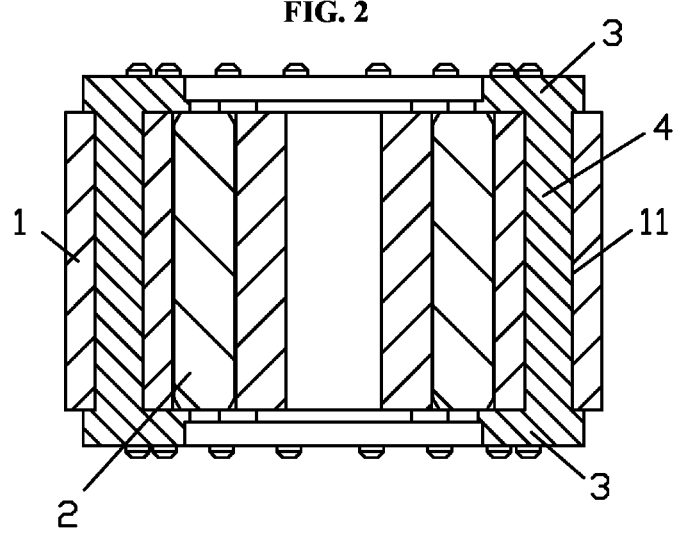
FIG. 3 is a cross sectional view taken from line A-A in FIG. 2.
Figure 4:
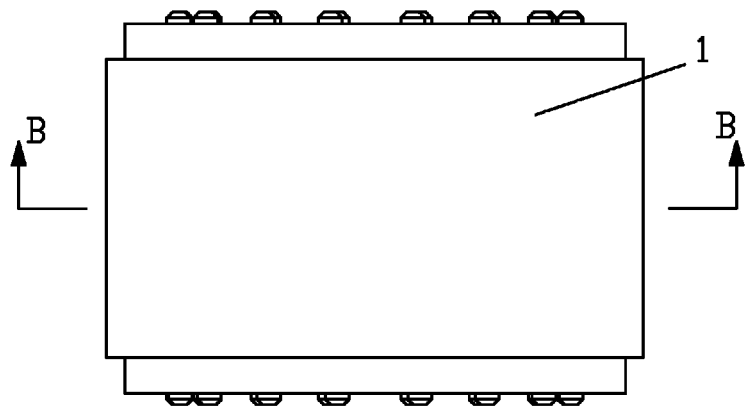
FIG. 4 is a front view of a motor rotor assembly in accordance with one exemplary embodiment of the invention.
Figure 5:
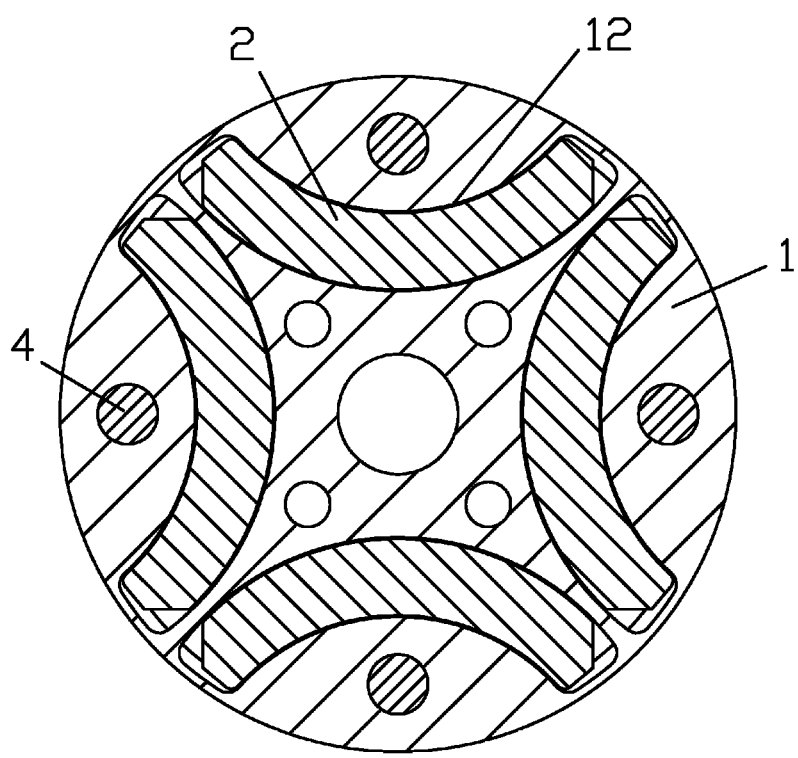
FIG. 5 is a cross sectional view taken from line B-B in FIG. 4.

As shown in FIGS. 1-5, a motor rotor assembly comprises a rotor core 1, a plurality of permanent magnets 2 and end plates 3. The permanent magnets 2 are disposed on the rotor core 1, and the end plates 3 are disposed at two end surfaces of the rotor core 1, respectively. A plurality of grooves 31 is disposed at the outer edge of the top surface of the end plates 3, a plurality of convex columns 32 protrudes from the bottom wall of the end plates 3, and a plurality of bosses 33 protrudes from the side wall of the end plates 3. The end plates 3, the convex columns 32 and the bosses 33 are integrated in a one-step injection molding. The rotor core 1 is provided with a plurality of through holes 11, and joint pins 4 are disposed in the through holes 11 to connect the end plates 3 at the two end surfaces of the rotor core 1. The two end plates 3, the joint pins 4 and the rotor core 1 are integrated in a one-step injection molding. A plurality of curved mounting grooves 12 is disposed on the rotor core 1, so that the curved permanent magnets 2 are embedded in the mounting grooves 12.

The principle of the motor rotor assembly is that: a plurality of grooves 31 is disposed at the outer edge of the top surface of the end plates 3, and a plurality of convex columns 32 protrudes from the bottom wall of the end plates 3. The top surfaces of the convex columns 32 can be melted using soldering iron to form an overturned mushroom-head structure which can tightly press and fix the weighting materials in the grooves. The fixing mode is reliable, and can effectively prevent the detachment of the weighting materials from the grooves.

Example 2

Figure 6:
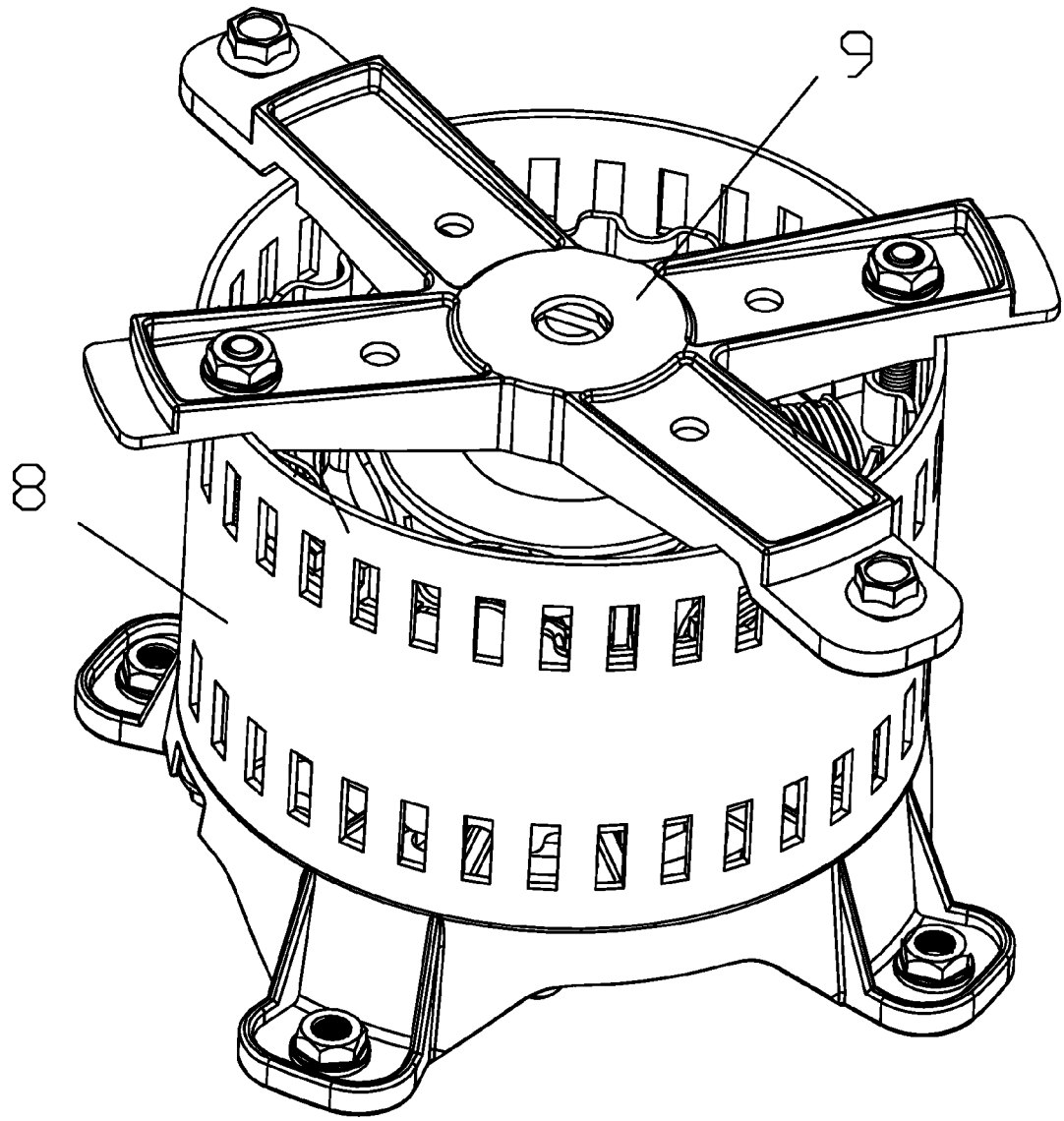
FIG. 6 is a stereogram of a motor in accordance with one exemplary embodiment of the invention.
Figure 7:
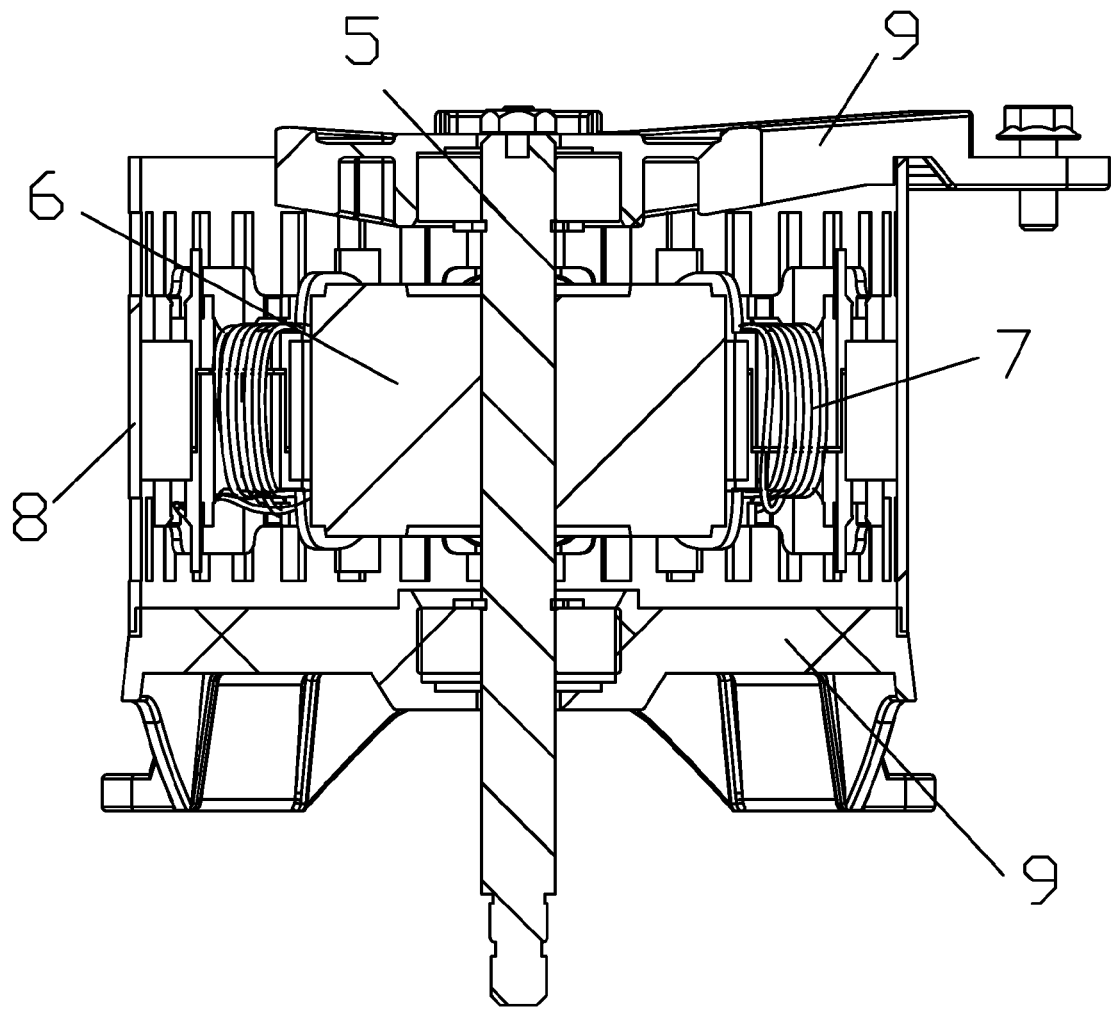
FIG. 7 is a schematic diagram of a motor in accordance with one exemplary embodiment of the invention.

As shown in FIGS. 1-7, a motor comprises a revolving shaft 5, a rotor assembly 6, a stator assembly 7, a housing 8, and end covers 9. The rotor assembly 6 is disposed on the revolving shaft 5. The stator assembly 7 and the housing 8 are connected together and sleeved on the rotor assembly 6. The end covers 9 are disposed at two ends of the housing 8. The revolving shaft 5 is supported by bearings of the two end covers 9. The motor rotor assembly 6 comprises a rotor core 1, a plurality of permanent magnets 2 and end plates 3. The permanent magnets 2 are disposed on the rotor core 1, and the end plates are disposed at two end surfaces of the rotor core 1, respectively. A plurality of grooves 31 is disposed at the outer edge of the top surface of the end plates 3, a plurality of convex columns 32 protrudes from the bottom wall of the end plates 3, and a plurality of bosses 33 protrudes from the side wall of the end plates 3. The end plates 3, the convex columns 32 and the bosses 33 are integrated in a one-step injection molding. The rotor core 1 is provided with a plurality of through holes 11, and joint pins 4 are disposed in the through holes 11 to connect the end plates 3 at the two end surfaces of the rotor core 1. The two end plates 3, the joint pins 4 and the rotor core 1 are integrated in a one-step injection molding. A plurality of curved mounting grooves 12 is disposed on the rotor core 1, so that the curved permanent magnets 2 are embedded in the mounting grooves 12.

The principle of the motor is that: a plurality of grooves 31 is disposed at the outer edge of the top surface of the end plates 3, and a plurality of convex columns 32 protrudes from the bottom wall of the end plates 3. The top surfaces of the convex columns 32 can be melted using soldering iron to form an overturned mushroom-head structure which can tightly press and fix the weighting materials in the grooves. The fixing mode is reliable, and can effectively prevent the detachment of the weighting materials from the grooves. The motor has simple structure, reliable fixing and high security.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor rotor assembly, comprising:
   a) a rotor core;
   b) a plurality of permanent magnets; and
   c) end plates;
wherein
   the plurality of permanent magnets is disposed on the rotor core;
   the end plates are disposed at two end surfaces of the rotor core, respectively;
   a plurality of grooves is disposed at an outer edge of a top surface of the end plates; and
   a plurality of convex columns protrudes from a bottom wall of the end plates.

2. The motor rotor assembly of claim 1, wherein a plurality of bosses protrudes from a side wall of the end plates.

3. The motor rotor assembly of claim 2, wherein the end plates, the convex columns, and the bosses are integrated in a one-step injection molding.

4. The motor rotor assembly of claim 1, wherein the rotor core is provided with a plurality of through holes, and joint pins are disposed in the plurality of through holes and connect the end plates at the two end surfaces of the rotor core.

5. The motor rotor assembly of claim 2, wherein the rotor core is provided with a plurality of through holes, and joint pins are disposed in the plurality of through holes and connect the end plates at the two end surfaces of the rotor core.

6. The motor rotor assembly of claim 3, wherein the rotor core is provided with a plurality of through holes, and joint pins are disposed in the plurality of through holes and connect the end plates at the two end surfaces of the rotor core.

7. The motor rotor assembly of claim 4, wherein two end plates, the joint pins and the rotor core are integrated in a one-step injection molding; a plurality of curved mounting grooves is disposed on the rotor core, and the permanent magnets are curved in shape and are embedded in the mounting grooves.

8. The motor rotor assembly of claim 5, wherein two end plates, the joint pins and the rotor core are integrated in a one-step injection molding; a plurality of curved mounting grooves is disposed on the rotor core, and the permanent magnets are curved in shape and are embedded in the mounting grooves.

9. The motor rotor assembly of claim 6, wherein two end plates, the joint pins and the rotor core are integrated in a one-step injection molding; a plurality of curved mounting grooves is disposed on the rotor core, and the permanent magnets are curved in shape and are embedded in the mounting grooves.

10. A motor, comprising:
a) a revolving shaft;
b) a rotor assembly;
c) a stator assembly;
d) a housing; and
e) end covers;
wherein
the rotor assembly is disposed on the revolving shaft;
the stator assembly and the housing are connected together and sleeved on the rotor assembly;
the end covers are disposed at two ends of the housing;
the revolving shaft is supported by bearings of the end covers;
the motor rotor assembly comprises a rotor core, a plurality of permanent magnets and end plates; the plurality of permanent magnets is disposed on the rotor core, and the end plates are disposed at two end surfaces of the rotor core, respectively; and
a plurality of grooves is disposed at an outer edge of a top surface of the end plates, and a plurality of convex columns protrudes from a bottom wall of the end plates.

11. The motor of claim 10, wherein a plurality of bosses protrudes from a side wall of the end plates.

12. The motor of claim 11, wherein the end plates, the convex columns, and the bosses are integrated in a one-step injection molding.

13. The motor of claim 10, wherein the rotor core is provided with a plurality of through holes, and joint pins are disposed in the plurality of through holes and connect the end plates at the two end surfaces of the rotor core.

14. The motor of claim 11, wherein the rotor core is provided with a plurality of through holes, and joint pins are disposed in the plurality of through holes and connect the end plates at the two end surfaces of the rotor core.

15. The motor of claim 12, wherein the rotor core is provided with a plurality of through holes, and joint pins are disposed in the plurality of through holes and connect the end plates at the two end surfaces of the rotor core.

16. The motor of claim 13, wherein two end plates, the joint pins and the rotor core are integrated in a one-step injection molding; a plurality of curved mounting grooves is disposed on the rotor core, and the permanent magnets are curved in shape and are embedded in the mounting grooves.

17. The motor of claim 14, wherein two end plates, the joint pins and the rotor core are integrated in a one-step injection molding; a plurality of curved mounting grooves is disposed on the rotor core, and the permanent magnets are curved in shape and are embedded in the mounting grooves.

18. The motor of claim 15, wherein two end plates, the joint pins and the rotor core are integrated in a one-step injection molding; a plurality of curved mounting grooves is disposed on the rotor core, and the permanent magnets are curved in shape and are embedded in the mounting grooves.

* * * * *